Patented Oct. 22, 1940

2,219,261

UNITED STATES PATENT OFFICE 2,219,261

PROCESS OF ACTIVATING THE CARBON MONOXIDE ADSORPTION PROPERTY OF PLATINUM BLACK POWDER

Adolph Z. Mample, Glen Rock, N. J., assignor to The Western Union Telegraph Company, New York, N. Y., a corporation of New York No Drawing. Application July 15, 1937,
Serial No. 153,862

2 Claims. (Cl. 252—298)

This invention relates to a process for increasing the capacity and the rapidity of action of the molecular force or property of adsorption of contact catalysts.

Various substances possess the well known property of causing or assisting in the production of a chemical change in other substances or compounds, such for instance as the promotion of oxidizing reactions which result in combustion. Combustible gases may be caused to burn or be consumed in this manner. Substances having this property are known as catalysts.

Certain substances which may or may not possess the property of causing or promoting chemical change, possess a property which may be due to a molecular affinity, causing the formation of a mono-molecular film or other surface action when brought into contact with certain gases. This mono-molecular film depends primarily upon the property known as adsorption. Substances possessing the above described property are hereinafter referred to as catalysts or more particularly "contact catalysts."

I have discovered that certain "contact catalysts," for example platinum black, when brought into an atmosphere containing carbon monoxide, exhibit the phenomenon of adsorption, causing the carbon monoxide in contact with the surface of the platinum black to disappear, accompanied by a temporary rise in temperature, while unaccompanied by any chemical change such as occurs during the catalytic oxidation of combustible gases. This temporary thermal change due to adsorption may be employed to indicate the degree of concentration of carbon monoxide in the atmosphere under test by applying the heat of adsorption to operate a thermometer, an expansible member to control an electric circuit or similar indicating or signaling device as disclosed in my copending application Serial No. 152,181 filed July 6, 1937. Platinum black employed as a detector of carbon monoxide, may be used repeatedly. In order to restore its sensitivity, it is only necessary to aerate the contact catalyst for a short period of time and dehydrate it after use.

I have discovered that the sensitivity and capacity for thermal change of the platinum black may be greatly enhanced by a process of activation described herein. I have found that by subjecting the contact catalyst to an initial treatment of an exposure to a higher concentration of the gas with which the catalyst is to be associated for test purposes, the catalyst will be activated to such an extent that the heat of adsorption or the adsorption of the gas, or both, will be greater whenever employed with lower concentrations of the gas after such initial activation with the higher concentration.

One of the objects of my invention is to provide a method of activating "contact catalysts" to thereby increase sensibility and maximum thermal change due to adsorption. This is particularly useful in obtaining qualitative and quantitative indications of the concentrations of gases, particularly in the lower concentrations for example, in detecting low concentrations of the toxic carbon monoxide.

Platinum black above mentioned as exhibiting the property of adsorption, is obtained by reduction and precipitation from solutions of platinum. The property of adsorption in platinum black is particularly active in the presence of carbon monoxide whether alone or mixed with other gases, such as methane, ethane, acetylene, carbon dioxide, hydrogen, nitrogen, air, etc.

I have pointed out above that the phenomenon of adsorption is accompanied by a rise in temperature which is only temporary. The temperature rises to a maximum in a few minutes and then returns more slowly to equilibrium with the surrounding atmosphere, the heat being dissipated by radiation, convection and conduction. If after the catalyst has passed through a cycle of adsorption due to a certain concentration of CO, the volume of CO in the surrounding atmosphere or gaseous medium is increased, the catalyst will again exhibit the characteristic rise in temperature. Thus, in the case of a platinum black contact catalyst and a gas having an affinity for the platinum black, such as carbon monoxide, the temperature rise is approximately 20 degrees F., when the gas concentration is 1%. Now when the heat of adsorption of the contact catalyst has been dissipated, if the carbon monoxide content is increased to 2%, the temperature may again rise to 20 deg. F. In other words, if the platinum black contact catalyst is initially used in a lower concentration of carbon monoxide, the phenomenon exhibited was that the temperature of the platinum black would not multiply at higher concentrations based on the lower activation concentration. Thus, if used at 1% concentration of CO initially, the reading would approximate 20° F. and later a second exposure to 2% concentration would also approximate 20° F.

On the other hand, if the platinum black was first activated in a gaseous medium containing 2% carbon monoxide, the platinum black would thereafter be activated to produce a 37° F. rise initially and subsequently. Thus a second exposure (after initial activation at 2%) would indicate a temperature rise of 20° F. in a 1% CO content and approximately 37° F. in a 2% CO content, an increase of approximately 85%.

If however the platinum black previously activated at 2% was now exposed to a gaseous concentration of approximately 3% the rise would approximate 37° F., whereas if the platinum black was initially exposed to 3% concentration of CO the rise would be approximately 55° F. Thus activation up to 3% CO concentrations produces a phenomena of definite value in the determination of the toxic gas in the lower concentrations. Above 3% initial concentration an apparent poisoning of the platinum black takes place.

The temperature change is not exactly proportional to percentage of gas in the initial activation process but approximates it. Thus a 1% CO initial activation will produce approximately 1.9° F. change for a subsequent .1% CO test; a 2% CO initial activation will produce approximately a 2.7° F. change for a subsequent .1% CO test; whereas a 3% CO initial activation will produce approximately a 3° F. change for a subsequent test in a .1% CO atmosphere.

Where accurate quantitative values are desired, it is necessary to calibrate each instrument but for all practical purposes a 3° F. rise to indicate 10 parts of CO in 10,000 parts of air, or 1° F. rise to indicate 3 parts of CO in 10,000 parts of air, is, to all practical purposes, satisfactory.

In the process of activating the contact catalyst, it is essential, first, that the catalyst be free from any poisoning and, second, that as large a surface area of the catalyst as is possible in proportion to the volume of the catalyst be exposed to the gas. It is also desirable that the particle size be varied, bordering on the smaller size particles, but it is preferable that the granules be of a size not smaller than will pass through a 300 mesh screen nor larger than will pass through an 80 mesh screen. In the activation of the catalyst, it is desirable that the temperature of activation be not permitted to exceed 30 deg. C. above ordinary or prevailing room temperatures.

The following examples illustrate some of the preferred methods of activating the contact catalysts, but it is understood the invention is not to be limited to the specific disclosures hereinafter described nor to the use of carbon monoxide alone.

*Examples of activation process*

(1) Platinum black made by reduction and precipitation from solutions of platinum should be screened to obtain granule sizes varying between 350 and 80 mesh. The platinum black in quantities of approximately two grams should be placed in cylindrical wire baskets of about 350 mesh screening or porous containers maintained at normal room temperature. A quantity of carbon monoxide gas, equal to the maximum concentration to which it is proposed the contact catalyst will be used in any particular application, should be inserted in a bottle or container and sealed for about 20 minutes. The platinum black should be inserted in the bottle for 2 minutes and removed. However, if the rise in temperature of the platinum black exceeds 30 deg. C., the platinum black should be removed even though the 2 minute period has not elapsed. The platinum black should be aerated in fresh air for at least 1½ hours. After aeration, the platinum black may then be used as hereinafter indicated.

(2) Quantities of platinum black made by reduction and precipitation from solutions of platinum should be screened to obtain granule sizes varying between 350 and 80 mesh, and then placed in a cylindrical wire basket of 300 mesh screen, or a cylindrical basket made of a porous material. Approximately two grams of the contact catalyst may be used but in any quantity surface area of the catalyst exposed to the gas should be as large as possible in proportion to its volume. The baskets should then be placed in a dehydrator for at least 1½ hours. A glass bottle should be aerated and sufficient calcium chloride, dehydrite or similar dehydrating substance placed in the bottle and left sealed for at least two hours. A quantity of carbon monoxide, equal to the maximum concentration to which the contact catalyst will be used in any particular application should be inserted in the bottle or container and again sealed for approximately 20 minutes. The basket containing the platinum black should then be removed from the dehydrating bottle and placed in the gas sample bottle as quickly as practicable. Where the concentration of gas is 3% or more, the platinum black should be left in the bottle for approximately one minute, whereas two minutes will be required where the concentrations are less than 3%. If, in any case, the rise in temperature of the platinum black exceeds 30 deg. C., the platinum black should be removed before the expiration of the specified period of time.

The products of the above activating process will be found to be more active in producing appreciably higher temperatures or heats of adsorption when within the limits of the activating process than those which have not been subjected to any activating process.

It should here be observed that the contact catalysts will produce uniform and accurate results regardless of the amount of moisture in the catalyst or the gas to which it may be subjected, provided that both contain the same amount of moisture, that is, that the atmosphere to which the catalyst has been subjected and the gas have been at the same humidity.

In cases where there may be a variation in the humidity of the atmosphere to which the contact catalyst has been subjected and the humidity of the gas or gaseous atmosphere employed for activation, it is essential that all moisture be excluded from both the contact catalyst and the gas in order to obtain uniform and consistently accurate results.

I claim:

1. The process of increasing the molecular affinity of platinum black powder for carbon monoxide as exhibited in the temporary rise of temperature during the phenomenon of adsorption, which comprises subjecting the platinum black powder initially to concentrations of said gas higher than the concentrations to which said powder are to be subsequently subjected.

2. The process of treating platinum black powder to increase with an energy of activation the rise in temperature therein produced by adsorption due to the presence of low concentrations of carbon monoxide in the surrounding atmosphere or gaseous medium, comprising initially subjecting said platinum black powder to concentrations of carbon monoxide higher than said low concentrations.

ADOLPH Z. MAMPLE.